United States Patent
Chiou (10) Patent No.: US 9,436,491 B1
(45) Date of Patent: Sep. 6, 2016

(54) COMPUTER SYSTEM AND METHOD FOR TESTING HARDWARE DEVICE BASED ON VIRTUAL MACHINE

(71) Applicant: ACCELSTOR, INC., New Taipei (TW)

(72) Inventor: Hann-Huei Chiou, New Taipei (TW)

(73) Assignee: Accelstor, Inc., New Taipei (TW)

( * ) Notice: Subject to any disclaimer, the term of this patent is extended or adjusted under 35 U.S.C. 154(b) by 0 days.

(21) Appl. No.: 14/851,193

(22) Filed: Sep. 11, 2015

(30) Foreign Application Priority Data

Apr. 30, 2015 (TW) .............................. 104113838 A (51) Int. Cl.
*G06F 9/455* (2006.01)
*G06F 11/36* (2006.01)

(52) U.S. Cl.
CPC ....... *G06F 9/45545* (2013.01); *G06F 9/45558* (2013.01); *G06F 11/3688* (2013.01); *G06F 2009/45579* (2013.01)

(58) Field of Classification Search
CPC .................. G06F 9/45533; G06F 11/3688
USPC ............................ 717/124; 718/1
See application file for complete search history.

(56) References Cited

U.S. PATENT DOCUMENTS

| | | | |
|---|---|---|---|
| 7,580,826 B2 * | 8/2009 | Vega .................. | G06F 9/45558 703/13 |
| 8,775,152 B2 * | 7/2014 | Carroll ................. | H04L 41/145 703/20 |

* cited by examiner

*Primary Examiner* — Andy Ho
(74) *Attorney, Agent, or Firm* — Rosenberg, Klein & Lee (57) ABSTRACT

The invention provides a computer system and a method for testing hardware device based on virtual machine. The computer system comprises a virtual machine device installed with a guest operating system. The guest operating system comprises a guest driver and a hypervisor having an expansion test module. When the computer system is intended for testing the hardware device, the guest driver will issue a sequence of test instructions to a real hardware or a virtual hardware via the expansion test module. The real hardware or the virtual hardware processes the test instructions so as to generate at least one response signal and transmit the response signal to the guest driver via the expansion test module. The guest driver is capable of detecting the response signal in order to verify the correctness of the real hardware or the virtual hardware processing the test instructions.

20 Claims, 5 Drawing Sheets

COMPUTER SYSTEM AND METHOD FOR TESTING HARDWARE DEVICE BASED ON VIRTUAL MACHINE

CROSS-REFERENCE TO RELATED APPLICATIONS

This non-provisional application claims priority claim under 35 U.S.C. §119(a) on Taiwan Patent Application No. 104113838 filed Apr. 30, 2015, the entire contents of which are incorporated herein by reference.

FIELD OF THE INVENTION

The present invention is related to a computer system and a method for testing hardware device based on virtual machine, particularly to a computer system and a method for testing hardware and firmware of hardware device based on virtual machine.

BACKGROUND

In the former hardware or firmware development of hardware devices, it is practical for testing personnel to connect a hardware device under development to a host computer, and install a firmware driver of a driving device into the host operating system of the host computer. After that, the driver is used to issue a sequence of test instructions to the hardware device, so as to test whether the hardware device is capable of operating normally or not, or to verify whether the hardware device is capable of responding to the erroneous test instructions correctly or not.

In the convention test procedure for hardware devices, however, when abnormality occurs in the test for hardware or firmware drivers of the hardware devices, it is probable to cause the host operating system of the host computer to crash or collapse, or even to damage data of the host operating system in serious cases, thereby causing the risk for the system in the test. Moreover, when the host operating system of the host computer crashes or collapses, it is necessary for the host computer to take a period of time to reboot, so as to test firmware/hardware of the hardware devices again. Thus, not only inconvenience in test procedure, but also increased duration of test procedure may be resulted.

SUMMARY

The present invention proposes a computer system and method for testing hardware device based on virtual machine, in which the computer system is capable of testing hardware or firmware of the real hardware by the use of the virtual machine. In case of abnormality occurring during the test for hardware or firmware driver of the real hardware, only the operation of the guest operating system of the virtual machine may be affected, without causing the host operating system of the computer system to crash or collapse. Then, safety of the computer system may be ensured during the test for hardware or firmware driver of the real hardware.

The present invention proposes a computer system and method for testing hardware device based on virtual machine, in which the computer system is allowed to utilize a virtual hardware to simulate operational functions of the peripheral hardware device. Thus, it is possible to develop the firmware driver of the peripheral hardware device, without connection to an external peripheral hardware device. Thereby, convenience and effectiveness in development of firmware driver may be enhanced.

For achieving above objects, the present invention provides a computer system for testing hardware device based on virtual machine, comprising a virtual machine, the virtual machine comprising a guest operating system, the guest operating system comprising a guest driver installed in the guest operating system and used for issuing a sequence of test instructions; and a hypervisor comprising an expansion test module; and a real hardware connected to the expansion test module via a hardware pass-through unit, in which the test instructions are transmitted by the guest driver to the real hardware in turn via the expansion test module. The real hardware is allowed to process the test instructions so as to generate at least one response signal, and the response signal is then transmitted to the guest driver via the expansion test module.

In one embodiment of the present invention, an erroneous instruction or an instruction not complying with transport protocols is added into the test instructions by the expansion test module.

In one embodiment of the present invention, a time delay is set in the expansion test module, in such a way that the expansion test module may delay the transmission of each test instruction to the real hardware according to the time delay.

In one embodiment of the present invention, if the real hardware is capable of determining the inclusion of an erroneous instruction, an instruction not complying with transport protocols in the test instructions, or the presence of delay in instruction transmission by processing the test instructions, a response signal labeled with firmware error will be generated.

In one embodiment of the present invention, the test instructions are duplicated by the expansion test module, such that the test instructions are transmitted to the real hardware repeatedly.

In one embodiment of the present invention, erroneous data or data not complying with transport protocols is added into the response signal by the expansion test module.

In one embodiment of the present invention, a time delay is set in the expansion test module, in such a way that the expansion test module may delay the transmission of each response signal to the guest driver according to the time delay.

In one embodiment of the present invention, the real hardware is a peripheral hardware device complying with PCI, PCI Express, SATA or USB transport protocols.

The present invention further provides a computer system for testing hardware device based on virtual machine, comprising a virtual machine, the virtual machine comprising a guest operating system, the guest operating system comprising a guest driver installed in the guest operating system and used for issuing a sequence of test instructions; and a hypervisor comprising an expansion test module and a virtual hardware, in which the test instructions are transmitted by the guest driver to the virtual hardware in turn via the expansion test module. The virtual hardware is allowed to process the test instructions so as to generate at least one response signal, and the response signal is then transmitted to the guest driver via the expansion test module.

In one embodiment of the present invention, the virtual hardware is simulated as a device complying with PCI, PCI Express, SATA or USB transport protocols by the hypervisor.

The present invention further provides a computer system for testing hardware device based on virtual machine, comprising a virtual machine, the virtual machine comprising a guest operating system, the guest operating system comprising a guest driver installed in the guest operating system and used for issuing a sequence of test instructions; and a hypervisor comprising an expansion test module and a virtual hardware, in which the test instructions are transmitted by the guest driver to the expansion test module in turn. The expansion test module may generate at least one response signal directly if it is capable of processing the test instructions; otherwise, the test instructions are transmitted, by the expansion test module, to the virtual hardware, by which the test instructions are processed and the response signal is then generated, and then the response signal being transmitted to the guest driver via the expansion test module.

The present invention further provides a method for testing hardware device based on virtual machine, the method being applied to a computer system installed with a virtual machine. The virtual machine comprises a guest operating system and a hypervisor, in which the guest operating system is installed with at least one guest driver, and the hypervisor comprises an expansion test module. The method comprises the steps of: issuing a sequence of test instructions and then transmitting these test instructions to the expansion test module by the guest driver; transmitting the test instructions to a real hardware or a virtual hardware by the expansion test module; processing the test instructions, so as to generate at least one response signal by the real hardware or the virtual hardware; and transmitting the response signal to the guest driver via the expansion test module by the real hardware or the virtual hardware.

DETAILED DESCRIPTION OF THE PREFERRED EMBODIMENTS

The present invention may be exemplified but not limited by various embodiments as described hereinafter.

Figure 1:
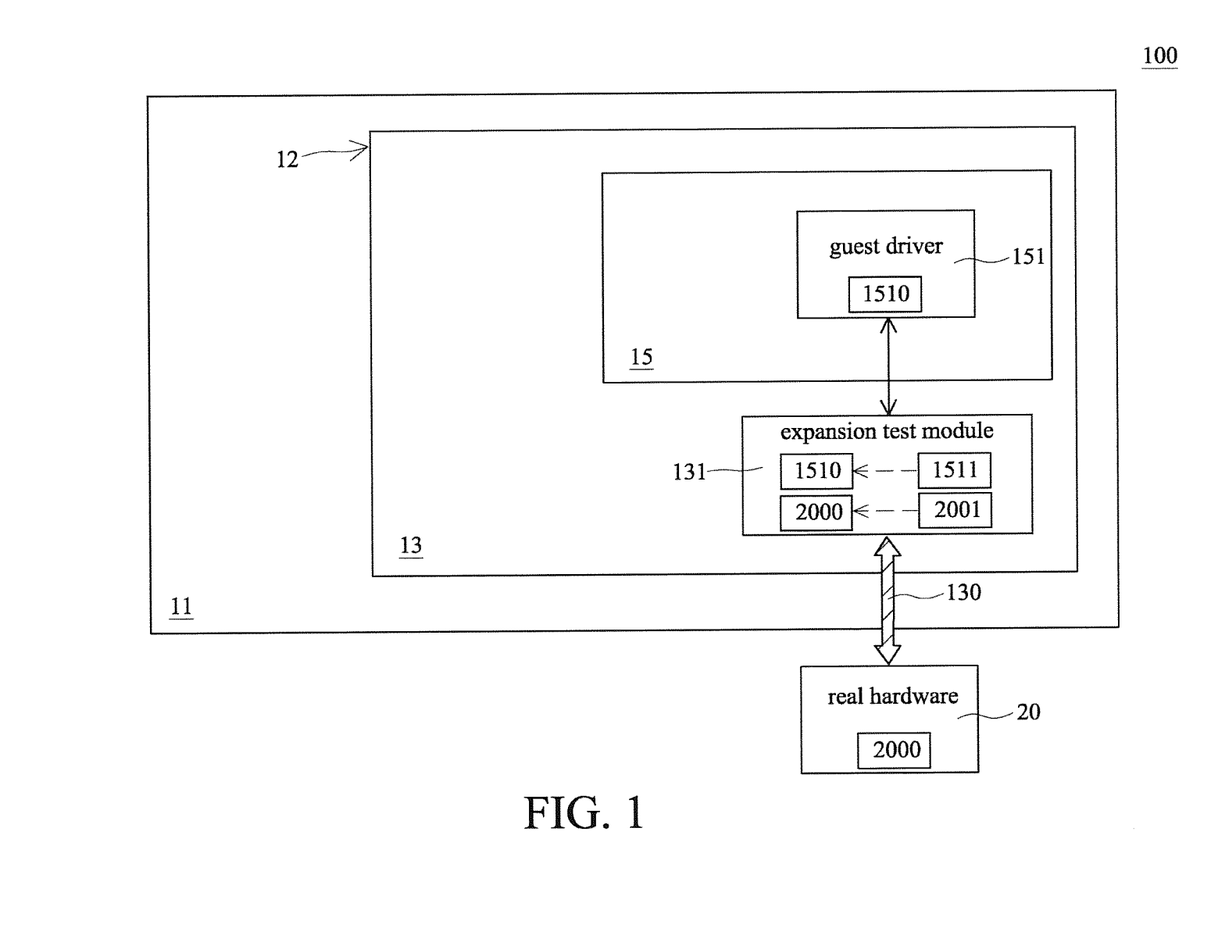
FIG. 1 is a structural diagram of a computer system for testing hardware device based on virtual machine according to one embodiment of the present invention.

Referring to FIG. 1, there is shown a structural diagram of a computer system for testing hardware device based on virtual machine according to one embodiment of the present invention. As illustrated in FIG. 1, the computer system 100 of the present embodiment comprises a virtual machine 12 arranged inside a host operating system 11. The virtual machine 12 comprises a hypervisor 13 and a guest operating system 15. The hypervisor 13 comprises an expansion test module 131, while the guest operating system 15 is installed with a guest driver 151.

In the present embodiment, the expansion test module 131 of the virtual machine 12 may be connected to an external real hardware 20 via a hardware pass-through unit 130. This hardware pass-through unit 130 is a software interface capable of building communication connections between the virtual machine 12 and the real hardware 20. In the present invention, the real hardware 20 may be also a peripheral hardware device complying with PCI, PCI Express, SATA, USB, or other interface transport protocols.

When the computer system 100 is intended for testing the real hardware 20, a sequence of test instructions 1510 are issued by the guest driver 151 and then transmitted to the real hardware 20 via the expansion test module 131. The real hardware 20 is allowed to process the test instructions 1510 so as to generate at least one response signal 2000, and the response signal 2000 is then transmitted to the guest driver 151 via the expansion test module 131. Afterwards, the guest driver 151 is informed whether the real hardware 20 is driven to operate normally or not by detecting the response signal 2000.

In another embodiment of the present invention, the test instructions 1510 issued by the guest driver 151 may be duplicated by the expansion test module 131, and the test instructions 1510 are transmitted to the real hardware 20 repeatedly, in such a way that these test instructions 1510 are processed by the real hardware 20 repeatedly in order to verify the reliability of the real hardware 20.

In another embodiment of the present invention, additionally, the computer system 100 may be used for executing a test procedure for debugging the real hardware 20. An additional instruction 1511 may be added, by the expansion test module 131, into the test instructions 1510 issued by the guest driver 151, in which this additional instruction 1511 may be an erroneous instruction or an instruction not complying with transport protocols; otherwise, a time delay is set in the expansion test module 131, in such a way that the expansion test module 131 may delay the transmission of each test instruction 1510 to the real hardware 20 according to the time delay. If the real hardware 20 is capable of determining the inclusion of erroneous instruction, instruction not complying with transport protocols in the test instructions 1510, or the presence of delay in instruction transmission correctly when these test instructions 1510 are received, a response signal 2000 labeled with firmware error may be generated, and this response signal 2000 labeled with firmware error is then transmitted to the guest driver 151 via the expansion test module 131. The guest driver 151 is then informed that the real hardware 20 is capable of processing the erroneous test instructions 1510 correctly by detecting this response signal 2000 labeled with firmware error. On the contrary, if the real hardware 20 is incapable of determining the inclusion of erroneous instruction, instruction not complying with transport protocols in the test instructions 1510, or the presence of delay in instruction transmission when these test instructions 1510 are received, a regular response signal 2000 may be still generated in a normal procedure, and this regular response signal 2000 is then transmitted to the guest driver 151 via the expansion test module 131. The guest driver 151 is informed that, the real hardware 20 is incapable of processing the erroneous test instructions 1510 correctly by detecting this regular response signal 2000, and a developer of the real hardware 20 may be allowed to carry out modifications on the hardware of the real hardware 20.

In another embodiment of the present invention, of course, the computer system 100 is possible to execute a test procedure for debugging the guest driver 151. An additional signal 2001 may be added, by the expansion test module 131, into the response signal 2000 transmitted by the real hardware 20, in which this additional signal may be erroneous data or data not complying with transport protocols; otherwise, a time delay is set in the expansion test module 131, in such a way that the expansion test module 131 may delay the transmission of each response signal 2000 to the guest driver 151 according to the time delay. If the guest driver 151 is capable of determining the inclusion of erroneous data, data not complying with transport protocols in the response signal 2000, or the presence of delay in signal transmission correctly when this response signal 2000 is received, the normal firmware design of the guest driver 151 without error will be ensured. On the contrary, if the guest driver 151 is incapable of determining the inclusion of erroneous data, data not complying with transport protocols in the response signal 2000, or the presence of delay in signal transmission when this response signal 2000 is received, a developer of the guest driver 151 will debug the firmware of the guest driver 151.

Herein, the computer system 100 of the present invention is allowed to test the real hardware 20 by the use of the virtual machine 12. In case of abnormality occurring during the test for hardware or firmware driver (for example, the guest driver 151) of the real hardware 20, only the operation of the guest operating system 15 of the virtual machine 12 may be affected, without causing the host operating system 11 of the computer system 100 to crash or collapse. Then, safety of the computer system 100 may be ensured during the test for hardware or firmware driver of the real hardware 20. Moreover, the virtual machine 12, affected by abnormality of the real hardware 20 or guest driver 151, may be restored to normal operation if only it is restarted.

Figure 2:
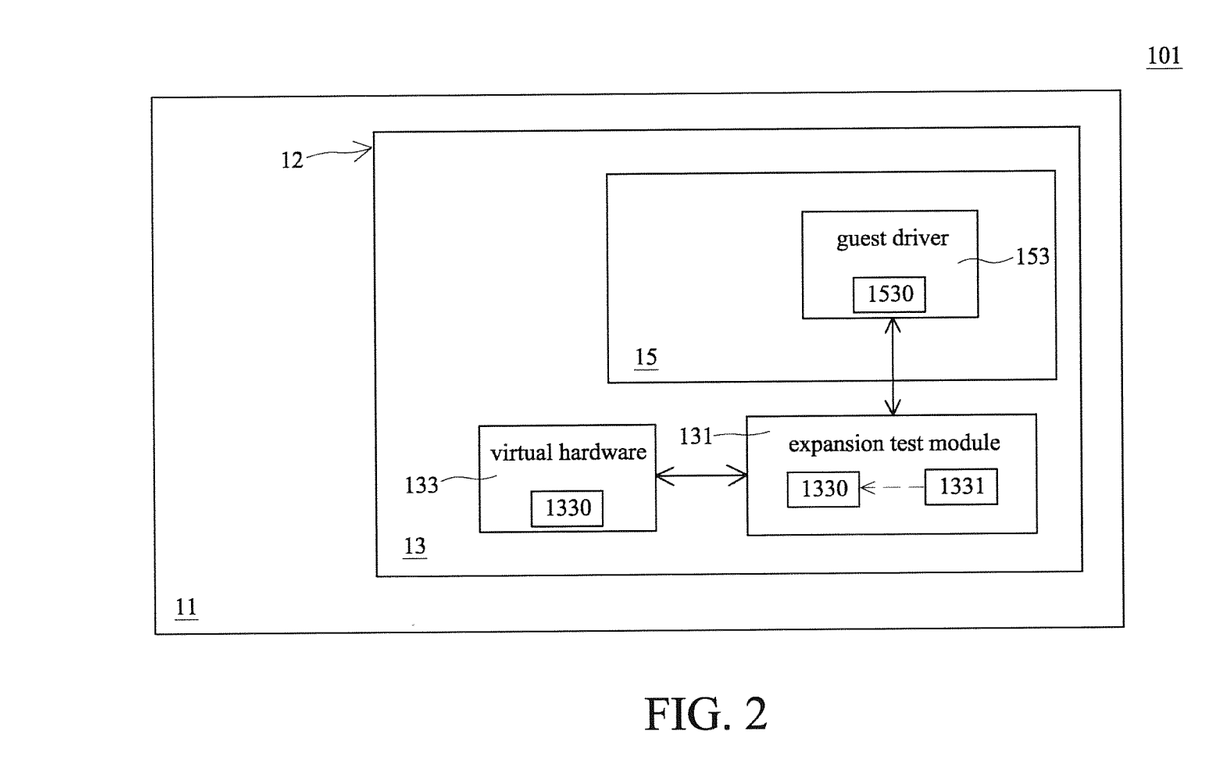
FIG. 2 is a structural diagram of a computer system for testing hardware device based on virtual machine according to another embodiment of the present invention.

Referring to FIG. 2, there is shown a structural diagram of a computer system for testing hardware device based on virtual machine according to another embodiment of the present invention. As illustrated in FIG. 2, a hypervisor 13 of the virtual machine 12 of the computer system 101 of the present embodiment comprises a virtual hardware 133. The virtual hardware 133 is a virtual device formed by the hypervisor 13 simulating of the real hardware 20, and should comply with PCI, PCI Express, SATA or USB transport protocols. Further, the guest operating system 15 comprises a guest driver 153 for the control of operation of virtual hardware 133.

When the computer system 101 is intended for testing whether the guest driver 153 is capable of controlling the virtual hardware 133 to operate normally or not, the guest driver 153 is requested to issue a sequence of test instructions 1530. These test instructions 1530 are transmitted to the virtual hardware 133 via the expansion test module 131. The virtual hardware 133 is allowed to process the test instructions 1530, so as to generate at least one response signal 1330, and the response signal 1330 is then transmitted to the guest driver 153 via the expansion test module 131. Afterwards, the guest driver 153 is possible to verify whether its firmware design is correct or not by detecting the response signal 1330.

Furthermore, the computer system 101 is possible to execute a test procedure for debugging the guest driver 153. An additional signal 1331 may be added, by the expansion test module 131, into the response signal 1330 transmitted by the virtual hardware 133, in which this additional signal 1331 may be erroneous data or data not complying with transport protocols; otherwise, a time delay is set in the expansion test module 131, in such a way that the expansion test module 131 may delay the transmission of each response signal 1330 to the guest driver 153 according to the time delay. Afterwards, if the guest driver 153 is capable of determining the inclusion of erroneous data, data not complying with transport protocols in the response signal 1330, or the presence of delay in signal transmission correctly when this response signal 1330 is received, the normal firmware design of the guest driver 153 without error will be ensured. On the contrary, if the guest driver 153 is incapable of determining the inclusion of erroneous data, data not complying with transport protocols in the response signal 1330, or the presence of delay in signal transmission when this response signal 1330 is received, a developer of the guest driver 153 will debug the firmware of the guest driver 153.

Then, in the computer system 101 of the present embodiment, the virtual hardware 133 is utilized to simulate operational functions of the peripheral hardware device (for example, the real hardware 20 in FIG. 1). Thus, it is possible to develop the firmware driver (for example, the guest driver 153) of the peripheral hardware device, without connection to an external peripheral hardware device. Thereby, convenience and effectiveness in development of firmware driver may be enhanced.

Furthermore, in one embodiment of the present invention, the operational functions of the peripheral hardware device may be also simulated by the combination of the expansion test module 131 with the virtual hardware 133. In other words, some operational functions of the peripheral hardware device may be provided in the expansion test module 131, while the rest of operational functions of the peripheral hardware device may be provided in the virtual device 133. As such, when the test instructions 1530 issued by the guest driver 153 are received by the expansion test module 131, the expansion test module 131 will generate the response signal 1330 to respond to the guest driver 153 directly if it is capable of processing these test instructions 1530. On the contrary, these test instructions 1530 are transmitted to the virtual hardware 133, by which the response signal 1330 will be generated, if the expansion test module 131 is incapable of processing these test instructions 1530.

Figure 3:
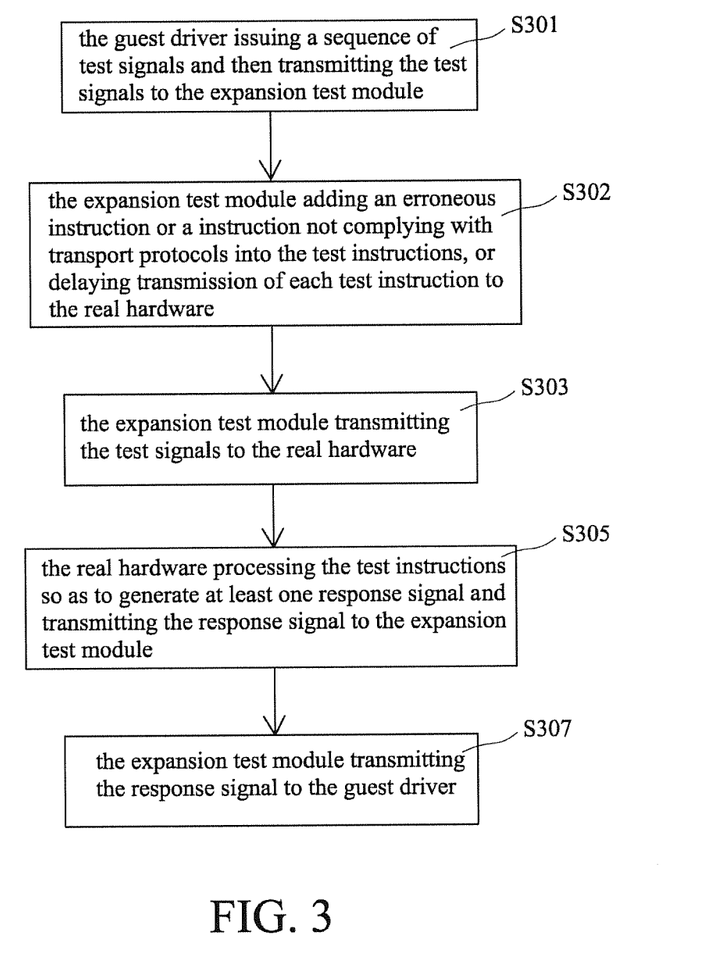
FIG. 3 is a flow chart of a hardware test method for testing hardware device based on virtual machine according to one embodiment of the present invention.

Referring to FIG. 3, cooperatively with FIG. 1, there is shown a flow chart of a hardware test method for testing hardware device based on virtual machine according to one embodiment of the present invention. When the computer system 100 is intended for testing the real hardware 20, step S301 is firstly executed, such that a sequence of test instructions 1510 are issued by the guest driver 151, and the test instructions 1510 are transmitted to the expansion test module 131.

Subsequently, in step S303, the test instructions 1510 are transmitted to the real hardware 20 by the expansion test module 131. In step S305, after the test instructions 1510 are received, the real hardware 20 is allowed to process these test instructions 1510 so as to generate at least one response signal 2000, and this response signal 2000 is then transmitted to the expansion test module 131. Afterwards, in step S307, the response signal 2000 is transmitted to the guest driver 151 by the expansion test module 131, and the guest driver 151 is then informed whether the real hardware 20 is driven to operate normally and the firmware design is correct or not by detecting the response signal 2000.

In another embodiment of the present invention, step 3302 is further executed before step S303, such that an erroneous instruction or an instruction not complying with transport protocols is added into the test instructions 1510 by the expansion test module 131, or transmission of each test instruction 1510 to the real hardware 20 is delayed by the expansion test module 131. Subsequently, in step S305, after the test instructions 1510, including the erroneous instruction, the instruction not complying with transport protocols, or presented with delay in instruction transmission, are received, the real hardware 20 is allowed to process these test instructions 1510 to generate the response signal 2000, and then transmit the response signal 2000 to the expansion test module 131. Afterwards, in step S307, the response signal 2000 is transmitted to the guest driver 151 by the expansion test module 131, and the guest driver 151 is then informed whether the real hardware 20 is capable of processing the erroneous test instructions 1510 correctly or not by detecting the response signal 2000. If the guest driver 151 is informed that the real hardware 20 is incapable of processing the erroneous test instructions 1510 correctly by detecting the response signal 2000, a developer of the real hardware 20 may be allowed to carry out modifications on the real hardware 20.

Figure 4:
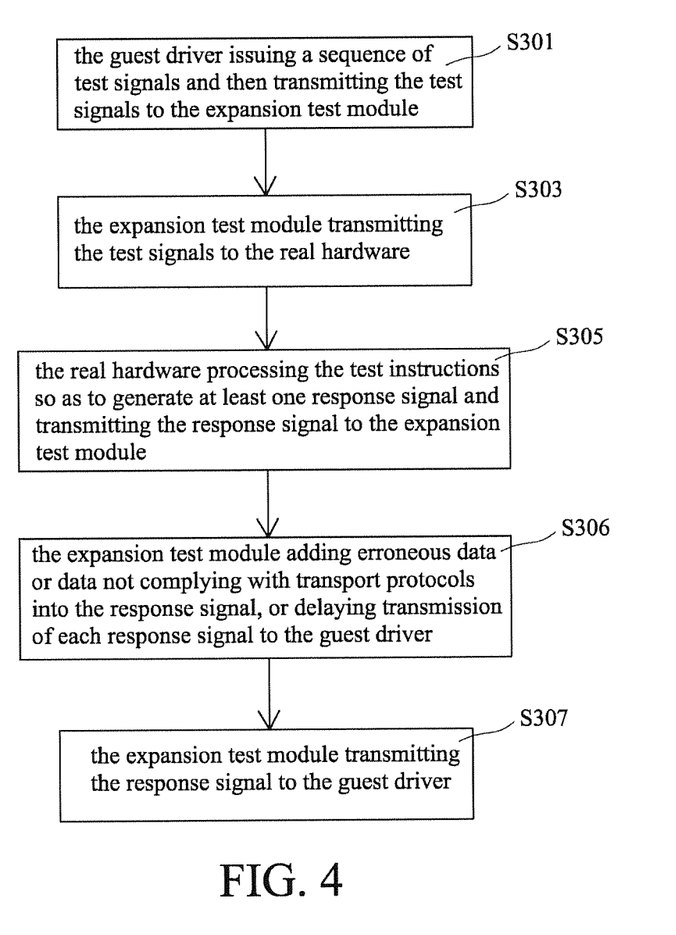
FIG. 4 is a flow chart of a firmware test method for testing hardware device based on virtual machine according to one embodiment of the present invention.

Referring to FIG. 4, cooperatively with FIG. 1, there is shown a flow chart of a firmware test method for testing hardware device based on virtual machine according to one embodiment of the present invention. When the computer system 100 is intended for testing the real hardware 20, as steps S301 and S303 described above, a sequence of test instructions 1510 are issued by the guest driver 151, and the test instructions 1510 are transmitted to the real hardware 20 via the expansion test module 131. In step S305, after the test instructions 1510 are received, the real hardware 20 is allowed to process these test instructions 1510 so as to generate at least one response signal 2000, and this response signal 2000 is then transmitted to the expansion test module 131.

Subsequently, step S306 is executed, such that erroneous data or data not complying with transport protocols may be added into the response signal 2000 by the expansion test module 131; or transmission of each response signal 2000 to the guest driver 151 is delayed by the expansion test module 131. Afterwards, in step S307, if the guest driver 151 is capable of determining the inclusion of erroneous data, data not complying with protocols in the response signal 2000, or the presence of delay in signal transmission correctly when this response signal 2000 is received, the normal firmware design of the guest driver 151 without error will be ensured. On the contrary, if the guest driver 151 is incapable of determining the inclusion of erroneous data, data not complying with transport protocols in the response signal 2000, or the presence of delay in signal transmission when this response signal 2000 is received, a developer of the guest driver 151 will debug the firmware of the guest driver 151.

Figure 5:
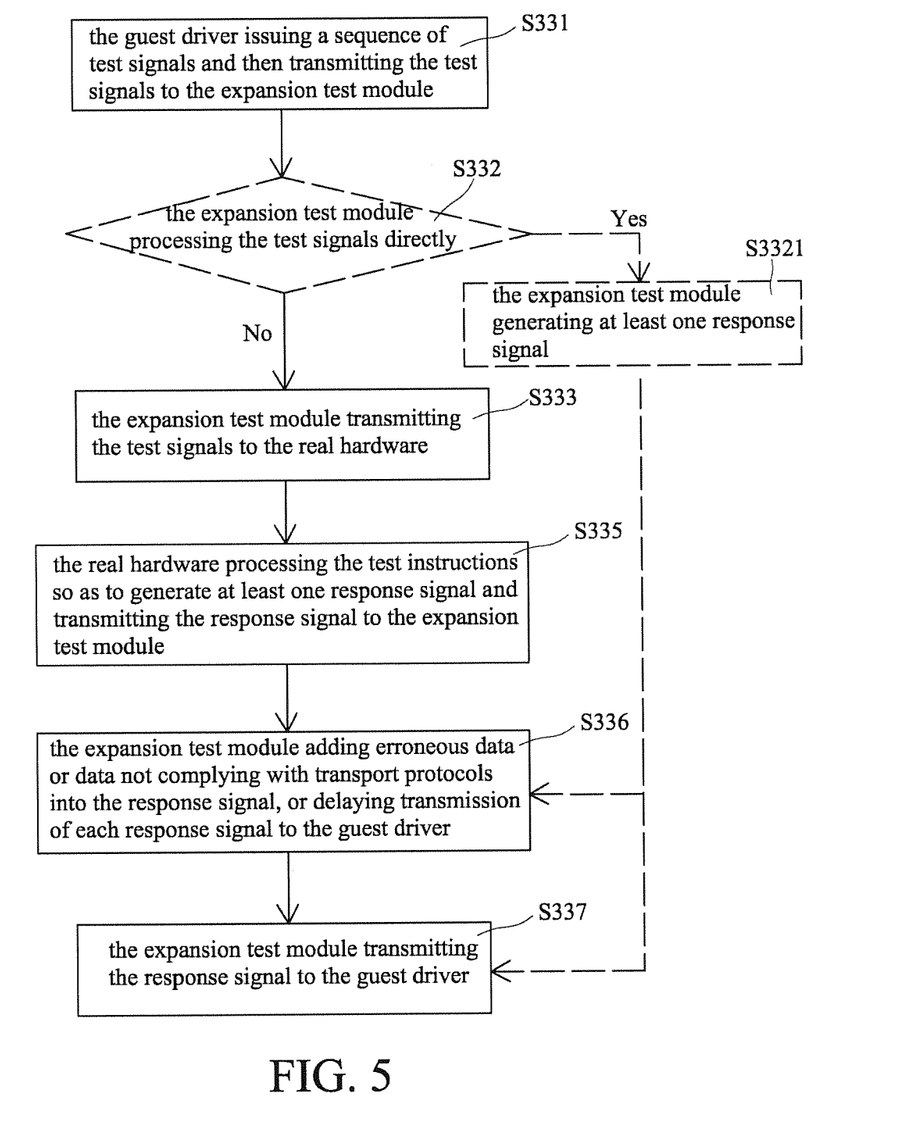
FIG. 5 is a flow chart of a method for testing hardware device based on virtual machine according to another embodiment of the present invention.

Referring to FIG. 5, cooperatively with FIG. 2, there is shown a flow chart of a method for testing hardware device based on virtual machine according to another embodiment of the present invention. When the computer system 100 is intended for testing the virtual hardware 133, step S331 is firstly executed, such that a sequence of test instructions 1530 are issued by the guest driver 153, and the test instructions 1530 are transmitted to the expansion test module 131.

Subsequently, in step S333, the test instructions 1530 are transmitted to the virtual hardware 133 by the expansion test module 131. In step S335, after the test instructions 1530 are received, the virtual hardware 133 is allowed to process these test instructions 1530 so as to generate at least one response signal 1330, and this response signal 1330 is then transmitted to the expansion test module 131. Afterwards, in step S337, the response signal 1330 is transmitted to the guest driver 153 by the expansion test module 131, and the guest driver 153 is then informed whether the virtual hardware 133 is driven to operate normally and the firmware design is correct or not by detecting the response signal 1330.

Furthermore, step S332 is further executed before step S333, so as to determine whether the expansion test module 131 is capable of processing the test instructions 1530 directly. If the expansion test module 131 is capable of processing the test instructions 1530 directly, step S3321 is executed subsequently, such that the expansion test module 131 will generate the response signal 1330. On the contrary, if the expansion test module 131 is incapable of processing the test instructions 1530, steps S333 and 3335 are executed subsequently, such that these test instructions 1530 are transmitted to the virtual hardware 133, by which the response signal 1330 will be generated.

In another embodiment of the present invention, step S336 is further executed before step S337, such that erroneous data or data not complying with transport protocols may be added into the response signal 1330 by the expansion test module 131; or transmission of each response signal 1330 to the guest driver 153 is delayed by the expansion test module 131. Afterwards, in step 9337, if the guest driver 153 is capable of determining the inclusion of erroneous data, data not complying with protocols in the response signal 1330, or the presence of delay in signal transmission correctly when this response signal 1330 is received from the expansion test module 131, the normal firmware design of the guest driver 153 without error will be ensured. On the contrary, if the guest driver 153 is incapable of determining the inclusion of erroneous data, data not complying with transport protocols in the response signal 1330, or the presence of delay in signal transmission when this response signal 1330 is received, a developer of the guest driver 153 will debug the firmware of the guest driver 153.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

What is claimed is:

1. A computer system for testing hardware device based on virtual machine, comprising:
    a virtual machine, comprising:
        a guest operating system, comprising:
            a guest driver, installed in said guest operating system, and used for issuing a sequence of test instructions; and
        a hypervisor, comprising an expansion test module; and
    a real hardware, connected to said expansion test module via a hardware pass-through unit, wherein said test instructions are transmitted by said guest driver to said real hardware in turn via said expansion test module, and said real hardware is allowed to process said test instructions so as to generate at least one response signal and said response signal is then transmitted to said guest driver via said expansion test module.

2. The computer system according to claim 1, wherein an erroneous instruction or an instruction not complying with transport protocols is added into said test instructions by said expansion test module.

3. The computer system according to claim 1, wherein a time delay is set in said expansion test module, in such a way that said expansion test module is allowed to delay transmission of each test instruction to said real hardware according to said time delay.

4. The computer system according to claim 1, wherein if said real hardware is capable of determining the inclusion of an erroneous instruction, a instruction not complying with transport protocols in said test instructions, or the presence of delay in instruction transmission by processing said test instructions, a response signal labeled with firmware error will be generated.

5. The computer system according to claim 1, wherein said test instructions are duplicated by said expansion test module, such that said test instructions are transmitted to said real hardware repeatedly.

6. The computer system according to claim 1, wherein erroneous data or data not complying with transport protocols is added into said response signal by said expansion test module.

7. The computer system according to claim 1, wherein a time delay is set in said expansion test module, in such a way that said expansion test module is allowed to delay transmission of each response signal to said guest driver according to said time delay.

8. The computer system according to claim 1, wherein said real hardware is a peripheral hardware device complying with PCI, PCI Express, SATA or USB transport protocols.

9. A computer system for testing hardware device based on virtual machine, comprising:
  a virtual machine, comprising:
    a guest operating system, comprising:
      a guest driver, installed in said guest operating system, and used for issuing a sequence of test instructions; and
    a hypervisor, comprising an expansion test module and a virtual hardware, wherein said test instructions are transmitted by said guest driver to said virtual hardware in turn via said expansion test module, and said virtual hardware is allowed to process said test instructions so as to generate at least one response signal and said response signal is then transmitted to said guest driver via said expansion test module.

10. The computer system according to claim 9, wherein at least one erroneous datum or datum not complying with transport protocols is added into said response signal by said expansion test module.

11. The computer system according to claim 9, wherein a time delay is set in said expansion test module, in such a way that said expansion test module is allowed to delay transmission of each response signal to said guest driver according to said time delay.

12. The computer system according to claim 9, wherein said virtual hardware is simulated as a device complying with PCI, PCI Express, SATA or USB transport protocols by said hypervisor.

13. A computer system for testing hardware device based on virtual machine, comprising:
  a virtual machine, comprising
    a guest operating system, comprising:
      a guest driver, installed in said guest operating system, and used for issuing a sequence of test instructions; and
    a hypervisor, comprising an expansion test module and a virtual hardware, wherein said test instructions are transmitted by said guest driver to said expansion test module in turn, and said expansion test module is allowed to generate at least one response signal directly if it is capable of processing said test instructions; otherwise, said test instructions are transmitted, by said expansion test module, to said virtual hardware, by which said test instructions are processed and said response signal is then generated, and then said response signal being transmitted to said guest driver via said expansion test module.

14. A method for testing hardware device based on virtual machine, said method being applied to a computer system installed with a virtual machine, said virtual machine comprising a guest operating system and a hypervisor, in which said guest operating system is installed with at least one guest driver, and said hypervisor comprises an expansion test module, said method comprising the steps of:
  issuing a sequence of test instructions and then transmitting said test instructions to said expansion test module by said guest driver;
  transmitting said test instructions to a real hardware or a virtual hardware by said expansion test module;
  processing said test instructions so as to generate at least one response signal by said real hardware or said virtual hardware; and
  transmitting said response signal to said guest driver via said expansion test module by said real hardware or said virtual hardware.

15. The method according to claim 14, further comprising a step of:
  adding an erroneous instruction or a instruction not complying with transport protocols into said test instructions by said expansion test module.

16. The method according to claim 14, further comprising a step of:
  setting a time delay in said expansion test module, in such a way that transmission of each test instruction to said real hardware is delayed according to said time delay.

17. The method according to claim 14, further comprising a step of:
  generating said response signal labeled with firmware error when said test instructions are determined as an erroneous instruction, a delayed instruction or a instruction not complying with transport protocols by said real hardware.

18. The method according to claim 14, further comprising a step of:
  duplicating said test instructions by said expansion test module, such that said test instructions are transmitted to said real hardware repeatedly.

19. The method according to claim 14, further comprising a step of:
  adding erroneous data or data not complying with transport protocols into said response signal by said expansion test module.

20. The method according to claim 14, further comprising a step of:
  setting a time delay in said expansion test module, in such a way that transmission of each response signal to said guest driver is delayed according to said time delay.

* * * * *